United States Patent Office 2,829,111
Patented Apr. 1, 1958

2,829,111

AZIDOETHYL-THIOPHOSPHORIC ACID ESTERS

Gerhard Schrader, Opladen, Germany, assignor to Farbenfabriken Bayer Aktiengesellschaft, Leverkusen, Germany, a corporation of Germany No Drawing. Application January 23, 1957
Serial No. 635,589

Claims priority, application Germany February 9, 1956

9 Claims. (Cl. 260—349)

This invention relates to and has as its objections new and useful thiophosphoric acid esters and their preparations. Generally these new esters may be represented by the formula

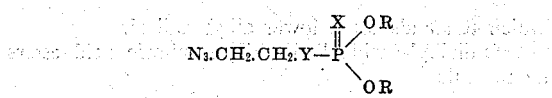

in which X and Y stand for oxygen or sulphur, at least one of them being sulphur, and R stands for alkyl radicals especially lower alkyl radicals, such as methyl, ethyl, propyl, isopropyl, butyl, amyl, hexyl and the like.

Many thiophosphoric acid esters are well known as effective insecticides or more generally pesticides. Novel and effective compounds of this class of thio- or dithio-phosphoric acid esters now have been prepared, which have outstanding properties with some respects especially they distinguish themselves by being effective against sucking insects.

It is known that ethylene-chlorohydrin may be reacted with the alkali metal salts of hydrazoic acid to give azido-ethyl-alcohol in good yield. Furthermore, by the reaction of this alcohol with hydrobromic acid, azidoethyl-bromide may easily be prepared from azidoethyl-alcohol.

It has now been found that new compounds are obtainable by esterification of azidoethyl-alcohol with O, O-dialkyl-thiophosphoric acid halides or by reaction of an azidoethyl halide, for instance the bromide, with the alkali metal or ammonium salts of O, O-dialkylthiol- or -thionothiol-phosphoric acids.

These types of reaction may be represented by the following reaction schemes using O, O-diethyl-thiophosphoric acid chloride and azidoethyl alcohol as reactants (a) or on the other side using azidoethyl bromide and O,O-diethyl-thio-(or dithio)-phosphoric acid-ammonium salt as reactants (b)

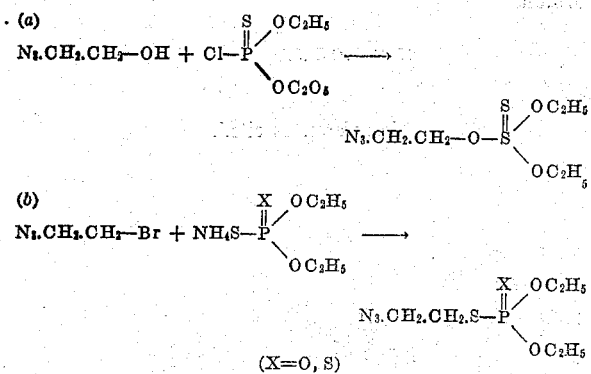

Instead of the above described diethylesters, however, also the corresponding methyl, propyl, butyl and higher esters may be used according to this invention. In the reaction (a) instead of thiophosphoric acid chloride also other halides such as the bromide may be used for carrying out this reaction. If thiol- or dithio-phosphoric acid esters according to the above reaction scheme (b) have to be prepared also other salts than ammonium salts may be used for carrying out this reaction. These other salts may specially include alkali metal salts such as the sodium or potassium salt. The reaction according to scheme (b) may also be carried out using the free phosphoric acids and adding during the reaction a suitable acid binding agent such as alkali metal hydroxides, carbonates, alcoholates and the like. Also tertiary amines may be used as acid binding agents.

In both cases the reaction generally is carried out in an inert organic solvent. Examples of such inert solvents are water, lower alcohol or ketones such as methanol-, ethanol-, acetone-, methylethyl-ketones and the like. Sometimes it might be advisable to carry out the reaction in an excess of liquid, aliphatic, aromatic or heterocyclic amines, thus using these at the same time as acid binding agents. Especially in the above shown reaction (a) this method is preferred. The reaction temperature may vary in wide limits, e. g. between about −20° to about 150° C. But sometimes lower or higher temperatures may also be advisable. A preferred temperature range is about 0° C. to about 100° C.

These new phosphoric acid esters are suitable as plant protectives. As against comparable insecticides the new compounds distinguish themselves by being highly effective not only against sucking insects, but also against eating insects. Caterpillars and beetles may, for example, thus be controlled with the aid of the new agents. Moreover, the new compounds have a systemic action.

The compounds of the present invention are generally valuable insecticides especially contact-insecticides and kill effectively insects such as flies, aphids, mites and the like. Usually they are to be applied in the same manner as other well known phosphorous containing insecticides, i. e. in concentrations from about 0.0001 to about 1% in dilution with liquid or solid carriers. Examples of such liquid carriers are water, alcohols, liquid hydrocarbons, ketones and the like and as examples of solid carriers there may be named talc, chalk, bentonite, etc. Additional emulsifiers may be used, if necessary, and the new compounds may be dusted or sprayed, e. g. as aerosols or brought in contact otherwise with living plants or insects.

The following examples are given by way of illustration only without, however, limiting the present invention hereto:

Example 1

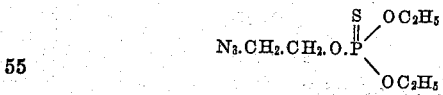

44 grams of azidoethyl-alcohol are dissolved in 45 grams of anhydrous pyridine. 97 grams of diethylthionophosphoric acid monochloride are added with stirring at 10° C. and the mixture is stirred at room temperature for 12 hours. The reaction product is then introduced into a mixture of 150 millilitres of ice water, 50 millilitres of dilute hydrochloric acid and 300 millilitres of benzene, the aqueous layer is separated and the benzene layer neutralised by the addition of a 5% sodium bicarbonate solution. After drying the benzene layer, the solvent is removed under vacuum. 85 grams of the crude ester are thus obtained as a sparingly water-soluble colourless oil of boiling point 71° C. at 0.01 mm. Hg. The new ester is not explosive. Solutions of 0.1% kill caterpillars completely.

Example 2

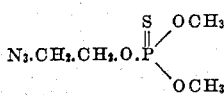

44 grams of azidoethyl-alcohol are dissolved in 45 grams of pyridine. 82 grams of dimethylthionophosphoric acid monochloride are added with stirring at 10° C. After stirring at room temperature for 15 hours, the reaction product is worked up as described in Example 1. 50 grams of crude azidothiophosphoric acid ester are thus obtained which can be distilled only with decomposition even under high vacuum.

Aqueous solutions of 0.1%, which may contain additionally a benzyldiphenyl-polyglycolether as an emulsifier show a complete systemic action against sucking insects. Caterpillars are also completely killed by this 0.1% solution.

Example 3

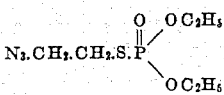

52 grams of the ammonium salt of diethylthiolphosphoric acid are dissolved in 60 millilitres of anhydrous alcohol. 40 grams of β-bromoazido-ethylalcohol are added with stirring at 55° C. and the temperature is maintained at 50–60° C. for an hour. The reaction product is filtered off with suction from the ammonium bromide separated out. The alcohol is then carefully removed by distillation. The residue thus obtained is taken up with 100 millilitres of benzene and washed three times with 20 millilitre-portions of ice water. After separating the benzene layer, the product is dried and the solvent removed by distillation under vacuum. 25 grams of the new azidothiolphosphoric acid ester are thus obtained as a light yellow sparingly water-soluble oil.

Using 57 grams of the ammonium salt of diethyldithiophosphoric acid there is obtained by the same method as described before the β-azidoethyl-O,O-diethyldithiophosphoric acid ester of the formula

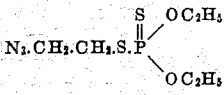

in an amount of 33.5 grams as a yellowish oil, which is sparingly water-soluble.

By the same method using the ammonium salts of the corresponding dimethylthiol-(or dithio)-phosphoric acids there are obtained the esters of the following formulae

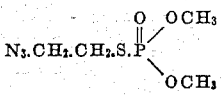

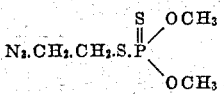

I claim:

1. O,O-dialkyl-(azidoalkyl)-thiophosphoric acid esters of the formula

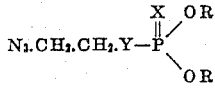

in which X and Y stand for a member selected from the group consisting of oxygen and sulphur, at least one of them being sulphur, and R stands for a lower alkyl radical.

2. O,O-dialkyl-(azidoalkyl)-thiophosphoric acid esters of the formula

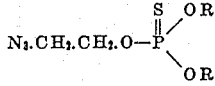

in which R stands for a lower alkyl radical.

3. O,O-dialkyl-(azidoalkyl)-thiophosphoric acid esters of the formula

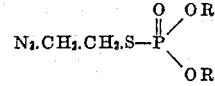

in which R stands for a lower alkyl radical.

4. O,O-dialkyl-(azidoalkyl)-thiophosphoric acid esters of the formula

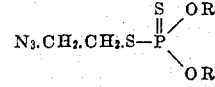

in which R stands for a lower alkyl radical.

5. An azidoethyl-thiophosphoric acid ester of the formula

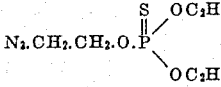

6. An azidoethyl-thiophosphoric acid ester of the formula

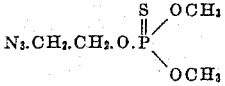

7. An azidoethyl-thiophosphoric acid ester of the formula

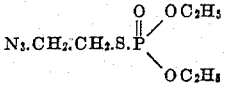

8. An azidoethyl-thiophosphoric acid ester of the formula

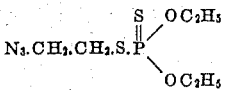

9. An azidoethyl-thiophosphoric acid ester of the formula

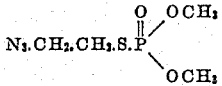

No references cited.

UNITED STATES PATENT OFFICE
Certificate of Correction

April 1, 1958

Patent No. 2,829,111

Gerhard Schrader

It is hereby certified that error appears in the printed specification of the above numbered patent requiring correction and that the said Letters Patent should read as corrected below.

Column 1, lines 52 to 59, Formula (a) should appear as shown below instead of as in the patent—

Signed and sealed this 12th day of August 1958.

[SEAL]

Attest:
KARL H. AXLINE,
*Attesting Officer.*

ROBERT C. WATSON,
*Commissioner of Patents.*